June 2, 1953     M. CARTER     2,640,972
DIRECTIONAL INDICATOR
Filed Jan. 15, 1951
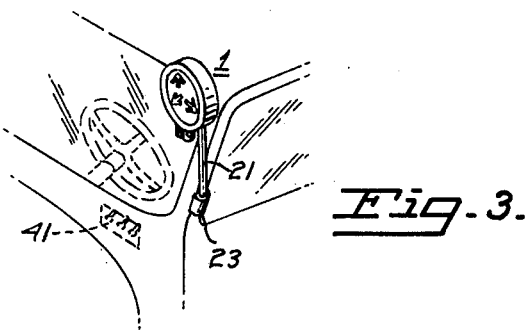
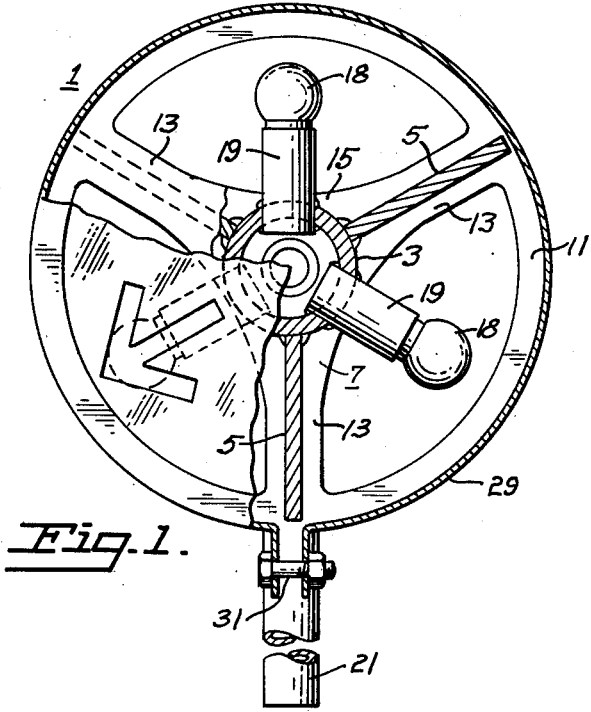
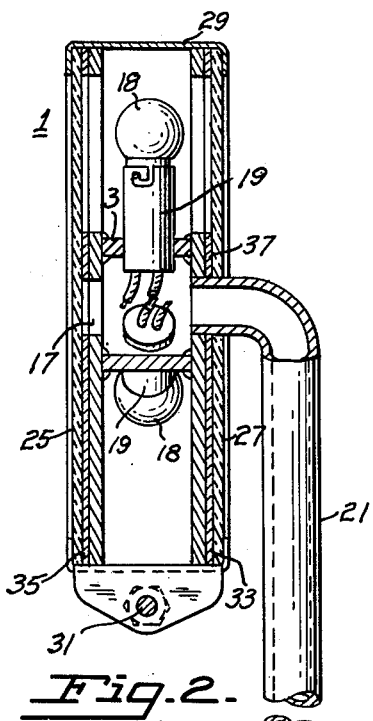
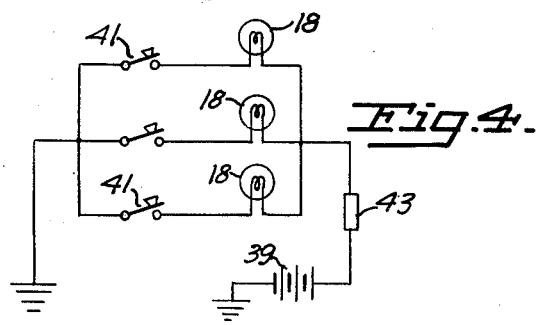
INVENTOR.
MOFFETT CARTER
BY
Bruce & Brosler
HIS ATTORNEYS Patented June 2, 1953

2,640,972

UNITED STATES PATENT OFFICE 2,640,972

DIRECTIONAL INDICATOR

Moffett Carter, Berkeley, Calif.

Application January 15, 1951, Serial No. 206,091

2 Claims. (Cl. 340—112)

My invention relates to signal means and more particularly to a directional indicator for automotive vehicles or the like.

Among the objects of my invention are:

(1) To provide a novel and improved directional indicator for automotive vehicles.

(2) To provide a novel and improved directional indicator for automotive vehicles, which indicator shall be visible fore and aft of the vehicle.

(3) To provide a novel and improved directional indicator for automotive vehicles in which the wiring of electrical components is facilitated, and in the finished device, all wiring is concealed from view.

(4) To provide a novel and improved directional indicator for automotive vehicles, capable of being fabricated economically.

Additional objects of my invention will be brought out in the following description of a preferred embodiment of the same taken in conjunction with the accompanying drawings wherein—

Figure 1 is an elevational view partly in section, depicting the structural features of the present invention.

Figure 2 is a view in section through the device of Figure 1.

Figure 3 is a view of the device shown installed in operative position on an automotive vehicle.

Figure 4 is a diagram of the electrical circuit employed in conjunction with the device of Figure 1.

Referring to the drawings for details of structure of my invention in its preferred form, the same comprises a cylindrical casing 1 having a hollow cylindrical hub 3 and a plurality of partitions 5 radiating from the hub to the periphery of the casing to define chambers.

In fabricating the casing, I first provide a skeleton framework involving a pair of circular window frames or supports 7 connected in parallel spaced relationship by the centrally disposed cylindrical hub 3 having an axial passage therethrough. Each of the aforementioned frames comprises a ring 11 having a plurality of radial arms 13 terminating therein from a central section 15 having a central opening 17 therethrough in alignment with the passage through the cylindrical hub. The radial partitions 5 interconect oppositely disposed arms and serve to partition the casing into a plurality of angular compartments. An electric light fixture is provided in each such compartment and takes the form of an electric light 18 and socket 19 which is mounted in the wall of the hollow cylindrical hub 3 with its base end exposed to the inside of said cylindrical hub whereby connections from such socket may be conducted outwardly of the casing by way of the hollow cylindrical hub.

A tubular bracket arm 21 having one end bent at substantially right angles, is connected to the casing by inserting its bent end into the central opening of one of the window frames 7 and welding or otherwise affixing it thereto, such bracket arm being designed for mounting in a suitable bracket 23 attached to the automotive vehicle. Such bracket arm serves the additional function of a conduit for leading the connections from the casing to the mounting bracket from where they may be taken to within the vehicle for connection in a suitable circuit.

Circular windows 25, 27 are disposed against each of the window frames, one of the windows 27 having a central opening enabling the same to be slid along the bracket arm into proper position. With both windows disposed against their respective supports, they are held assembled against the same by a band 29 wrapped edgewise around the assembly and formed with flanged edges to overlap the edges of the windows, such band forming the edge wall of the casing. The band is held in position by a tightening bolt 31 through the ends thereof, such ends being bent outwardly for the purpose of receiving such bolt.

Suitable gaskets 33, 35 may be inserted between the edges of the windows and the window frames or supports to cushion and weatherproof the seam at this point, and likewise a suitable gasket 37 may be inserted around the bracket arm prior to the application of the window to provide a weatherproof seal at this point in the assembly.

The windows at both sides of the assembly will be suitably masked to provide directional indications in line with the light source in each of the compartments, such indications preferably taking the form of arrows. The masking of the windows may be accomplished by the prior insertion of a suitable mask between the window frame and the window at either side of the assembly, or such masking may be accomplished by painting over the rear surface of each window, leaving the window clear over that area forming the indicator design.

The various lights are preferably connected in parallel across the battery 39 of the car on which the signal indicator is to be mounted, and a push button switch 41 disposed in each of the branch circuits. Such switches are preferably ganged and mounted within convenient reach of the driver of the vehicle, either on the steering post, steering wheel or on the dash board; and in a portion of the circuit common to all the branch circuits, I prefer to include a flasher-type relay 43 whereby upon pushing or closing one of the branch circuits, that particular light will flash on and off so long as the switch is held closed.

It will be apparent from the aforementioned description of my invention in its preferred form, that the device though of simple and rugged construction, will be very effective in indicating direction, both to vehicles approaching from behind as well as vehicles approaching from the front. It will further be noted that all of the wiring is concentrated within the hub cylinder where it will not only be concealed from view, and otherwise protected, but such manner of connecting the various signal lamps, eliminates completely the necessity of any wiring within the compartments.

While I have disclosed my invention in its preferred form and in considerable detail, the same is subject to alteration and modification without departing from the fundamental principles involved, and I accordingly do not desire to be limited in my protection to such details as I have illustrated and described except as may be necessitated by the appended claims.

I claim:

1. A directional signal comprising a casing having a hollow cylindrical hub, a plurality of partitions radiating therefrom to define chambers, and a window at each end of said hub and partitions, one of said windows having an opening in axial alignment with said hollow hub, a light socket in each chamber and mounted in said cylindrical hub, and electrical connections from said sockets leading out of said casing through said hollow cylindrical hub and window opening, means masking each window and providing a directional indication for each chamber, and a tubular supporting bracket connected to said casing through said window opening.

2. A directional signal comprising a casing having a hollow cylindrical hub and a plurality of partitions radiating therefrom to define chambers, and a window at each end of said hub and partitions, one of said windows having an opening in axial alignment with said hollow hub, a light socket in each chamber and mounted in said cylindrical hub, a tubular bracket arm passing through said window opening and affixed to said casing at the adjacent end of said cylindrical hub, and electrical connections from said sockets leading out of said casing through said hollow cylindrical hub and window opening and into said tubular bracket arm.

MOFFETT CARTER.

References Cited in the file of this patent

UNITED STATES PATENTS

| Number | Name | Date |
|---|---|---|
| 1,074,537 | Abeles | Sept. 30, 1913 |
| 1,546,643 | Fox | July 21, 1925 |
| 2,001,705 | Caponi | May 21, 1935 |
| 2,139,587 | Husemoller | Dec. 6, 1938 |